(12) United States Patent
Wang

(10) Patent No.: US 11,256,773 B2
(45) Date of Patent: Feb. 22, 2022

(54) DOCUMENT ONLINE PREVIEW METHOD AND DEVICE

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Ruibo Wang, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 344 days.

(21) Appl. No.: 16/349,329

(22) PCT Filed: Oct. 26, 2017

(86) PCT No.: PCT/CN2017/107730
§ 371 (c)(1),
(2) Date: May 13, 2019

(87) PCT Pub. No.: WO2018/095187
PCT Pub. Date: May 31, 2018

(65) Prior Publication Data
US 2019/0347307 A1 Nov. 14, 2019

(30) Foreign Application Priority Data
Nov. 22, 2016 (CN) .......................... 201611036737.4

(51) Int. Cl.
*G06F 16/00* (2019.01)
*G06F 16/957* (2019.01)
(Continued)

(52) U.S. Cl.
CPC ........ *G06F 16/9574* (2019.01); *G06F 16/116* (2019.01); *G06F 16/156* (2019.01); *G06F 16/172* (2019.01); *G06F 16/958* (2019.01)

(58) Field of Classification Search
CPC .. G06F 16/9574; G06F 16/958; G06F 16/156; G06F 16/116; G06F 16/172; G06F 16/957
(Continued)

(56) References Cited

U.S. PATENT DOCUMENTS 7,139,779 B1 * 11/2006 Kornelson ............ G06F 16/283
7,146,416 B1 * 12/2006 Yoo ...................... G06F 16/9535
709/224
(Continued)

FOREIGN PATENT DOCUMENTS

CN  102184177 A  9/2011
CN  102508892 A  6/2012
(Continued)

OTHER PUBLICATIONS

International Search Report for PCT application No. PCT/CN2017/107730 dated Jan. 24, 2018.
(Continued)

*Primary Examiner* — Thanh-Ha Dang
(74) *Attorney, Agent, or Firm* — Qinghong Xu

(57) ABSTRACT

A method and a device for previewing a document online are provided. The method includes: whether data associated with a primary key exist in a cache server according to the primary key of to-be-previewed content is queried; when determining from the query that data associated with the primary key exist, the data associated with the primary key from the cache server is obtained, and the data associated with the primary key to an application server is sent; after the data associated with the primary key is received, a
(Continued)

key-value pageview count of the primary key is determined; and when determining that a value of the key-value pageview count is not zero, the to-be-previewed content from a cloud storage server according to the primary key is obtained and the to-be-previewed content to the application server is provided for preview by a user.

20 Claims, 6 Drawing Sheets

(51) Int. Cl.
    *G06F 16/958* (2019.01)
    *G06F 16/14* (2019.01)
    *G06F 16/11* (2019.01)
    *G06F 16/172* (2019.01)

(58) Field of Classification Search
    USPC .......................................................... 707/713
    See application file for complete search history.

(56) References Cited

U.S. PATENT DOCUMENTS

| | | | |
|---|---|---|---|
| 9,141,713 B1* | 9/2015 | Narin | G06F 16/735 |
| 9,501,549 B1* | 11/2016 | Wang | G06F 16/951 |
| 2005/0278625 A1* | 12/2005 | Wessling | G06F 40/186 |
| | | | 715/273 |
| 2006/0047804 A1 | 3/2006 | Fredricksen et al. | |
| 2006/0095466 A1* | 5/2006 | Stevens | G06F 16/2428 |
| 2008/0201331 A1 | 8/2008 | Eriksen | |
| 2008/0235221 A1* | 9/2008 | Burns | G06F 16/34 |
| 2008/0255962 A1* | 10/2008 | Chang | G06Q 30/0629 |
| | | | 705/26.8 |
| 2012/0102062 A1* | 4/2012 | Gurnani | G06Q 30/0601 |
| | | | 707/769 |
| 2013/0144712 A1* | 6/2013 | Ruarte | G06Q 30/0246 |
| | | | 705/14.45 |
| 2014/0089135 A1* | 3/2014 | Linh | G06Q 30/0643 |
| | | | 705/26.7 |
| 2014/0136973 A1 | 5/2014 | Kumar et al. | |
| 2015/0052178 A1 | 2/2015 | Zhong | |
| 2015/0142882 A1* | 5/2015 | Wu | H04L 67/42 |
| | | | 709/203 |

FOREIGN PATENT DOCUMENTS

| | | |
|---|---|---|
| CN | 102792244 A | 11/2012 |
| CN | 103136208 A | 6/2013 |
| CN | 103714146 A | 4/2014 |
| CN | 104572870 A | 4/2015 |
| CN | 104615391 A | 5/2015 |
| CN | 104915454 A | 9/2015 |
| CN | 105183393 A | 12/2015 |
| CN | 105975601 A | 9/2016 |
| RU | 2527736 C2 | 9/2014 |
| WO | 2012075942 A1 | 6/2012 |
| WO | 2016112826 A1 | 7/2016 |

OTHER PUBLICATIONS

The 1st Office Action dated Mar. 29, 2021 from CN patent application No. 201611036737.4.
The RU1OA issued Apr. 14, 2020 by the RU Office.

\* cited by examiner

DOCUMENT ONLINE PREVIEW METHOD AND DEVICE

The present disclosure is based on International application No. PCT/CN2017/107730, filed on Oct. 26, 2017, which claims priority to Chinese patent application No. 201611036737.4, filed on Nov. 22, 2016, and the entire contents thereof are incorporated herein by reference.

TECHNICAL FIELD

The present disclosure relates to the technical field of Internet, and more particularly to a method for previewing a document online and a device for previewing a document online.

BACKGROUND

With the rapid development of the Internet, people can easily download various documents from the Internet to browse locally, but software for reading the corresponding documents needs to be installed locally. In addition, downloading documents, especially large-sized documents, requires additional waiting time, which may present poor user experience. In view of this, more and more websites tend to provide documents to be previewed online. Conventionally, online preview technology is to convert a document first for preview afterwards. However, most of them have lower performance and lower conversion rate.

At present, two document online preview solutions commonly used are as follows.

Conversion at Front-end and Preview Online. In this method for implementing document online preview, when a user clicks on a document for preview, a background program is triggered to convert the document. The advantage of this implementation method is that the document does not have to be completely converted, and the conversion is performed only when the user needs to view the document, which can reduce the burden on the server. The disadvantage is that when the document is relatively large, the waiting time for the user may be increased, which is almost similar to download, and may present poor user experience. In addition, conversion of large-sized document may easily fail under high concurrency.

Backend asynchronously converts the document. This document online preview method is to perform asynchronous conversion when the user uploads a document, and the user may preview the document upon clicking on the document in the foreground. The advantage of this implementation method is that the preview of the document in the foreground is quick and presents excellent experience. The disadvantage is that all the documents need to be converted, which imposes a large burden on the server. In addition, the conversion failure also occurs for large-sized documents.

It should be noted that the information disclosed in the Background section above is only for enhancement of understanding of the background of the present disclosure, and thus may include information that does not constitute prior art known to those of ordinary skill in the art.

SUMMARY

An objective of the present disclosure is to provide a method for previewing a document online and a device for previewing a document online, and at least to some extent overcome one or more problems due to limitations and disadvantages in the related art.

According to one aspect of the present disclosure, there is provided a method for previewing a document online, including:

querying whether data associated with a primary key exist in a cache server according to the primary key of to-be-previewed content:

when determining from the query that data associated with the primary key exist, obtaining the data associated with the primary key from the cache server, and sending the data associated with the primary key to an application server:

after the application server receives the data associated with the primary key, determining a key-value pageview count of the primary key included in the data associated with the primary key;

when determining that a value of the key-value pageview count is not zero, obtaining the to-be-previewed content from a cloud storage server according to the primary key and providing the to-be-previewed content to the application server; and receiving, by the application server, the to-be-previewed content for preview by a user.

In an exemplary embodiment of the present disclosure, the method further includes:

updating the key-value pageview count, and storing the updated key-value pageview count in the cache server In an exemplary embodiment of the present disclosure, the method further includes:

when the data associated with the primary key does not exist, obtaining the data associated with the primary key from a database; and when the data associated with the primary key exists in the database, sending the data associated with the primary key to the cache server; and when the data associated with the primary key does not exist in the database, creating a data original value associated with the primary key in the data base and sending the data original value associated with the primary key to the cache server, wherein the data original value has a key-value pageview count which is zero, and a visit time which is the current visit time.

In an exemplary embodiment of the present disclosure, the method further includes:

when determining that the value of the key-value pageview count is zero, converting the preview content, and uploading the converted preview content to the cloud storage server.

In an exemplary embodiment of the present disclosure, converting the preview content includes:

writing the primary key to a queue for conversion to wait for conversion; and obtaining the primary key waiting for conversion from the queue for conversion and obtaining the to-be-previewed content from the cloud storage server according to the primary key for conversion.

In an exemplary embodiment of the present disclosure, the method further includes:

when the preview content conversion is completed, modifying the key-value pageview count in the cache server to 1.

In an exemplary embodiment of the present disclosure, the method further includes:

providing a user waiting sign while converting the preview content; and when the conversion of the preview content is completed, cancelling the user waiting sign.

In an exemplary embodiment of the present disclosure, the method further includes:

periodically deleting data associated with the primary key in the cache server with the key-value pageview count less than a first preset value; and periodically deleting data associated with the primary key in the cache server with the visit time greater than a second preset value.

According to another aspect of the present disclosure, there is provided a device for previewing a document online, including:

a data querying module configured to query whether data associated with a primary key exist in a cache server according to the primary key of to-be-previewed content;

a first data obtaining module configured to, when determining from the query that data associated with the primary key exist, obtain the data associated with the primary key from the cache server, and send the data associated with the primary key to an application server;

a key-value pageview count determining module configured to, after the application server receives the data associated with the primary key, determine a key-value pageview count of the primary key included in the data associated with the primary key;

a preview content obtaining module configured to, when it is determined that a value of the key-value pageview count is not zero, obtain the to-be-previewed content from a cloud storage server according to the primary key and provide the to-be-previewed content to the application server; and a preview content receiving module configured to receive, by the application server, the to-be-previewed content to provide preview for the user.

In an exemplary embodiment of the present disclosure, the device further includes:

an update storage module configured to update the key-value pageview count, and store the updated key-value pageview count in the cache server.

In an exemplary embodiment of the present disclosure, the device further includes:

a second data obtaining module configured to, when determining from the query that the data associated with the primary key does not exist, obtain the data associated with the primary key from a database; and a first data sending module configured to, when the data associated with the primary key exists in the database, send the data associated with the primary key to the cache server; and a second data sending module configured to, when the data associated with the primary key does not exist in the database, create a data original value associated with the primary key in the data base and send the data original value associated with the primary key to the cache server, wherein the data original value has a key-value pageview count which is zero, and a visit time which is the current visit time.

In an exemplary embodiment of the present disclosure, the device further includes:

a preview content conversion module configured to, when determining that the value of the key-value pageview count is zero, convert the preview content, and upload the converted preview content to the cloud storage server.

In an exemplary embodiment of the present disclosure, converting the preview content includes:

writing the primary key to a queue for conversion to wait for conversion; and obtaining the primary key waiting for conversion from the queue for conversion and obtaining the to-be-previewed content from the cloud storage server according to the primary key for conversion.

In an exemplary embodiment of the present disclosure, it further includes:

when the preview content conversion is completed, modifying the key-value pageview count in the cache server to 1.

In an exemplary embodiment of the present disclosure, it further includes:

providing a user waiting sign while converting the preview content; and when the conversion of the preview content is completed, cancelling the user waiting sign.

In an exemplary embodiment of the present disclosure, the device further includes:

a first data deletion module configured to periodically delete data associated with the primary key in the cache server with the key-value pageview count less than a first preset value; and a second data deletion module configured to periodically delete data associated with the primary key in the cache server with the visit time greater than a second preset value.

According to another aspect of the present disclosure, there is provided an electronic device, including: one or more processors; a memory for storing one or more programs; and when the one or more programs are executed by the one or more processors, the one or more processors are caused to implement the method for previewing a document online as described above.

According to another aspect of the present disclosure, there is provided a computer readable medium having stored thereon a computer program, wherein the computer program is executed by a processor to implement the method for previewing a document online as described above.

In the method and the device for previewing a document online according to the exemplary embodiment, it is queried whether data associated with a primary key exist in a cache server according to the primary key of to-be-previewed content; then the data associated with the primary key is sent to an application server; after the application server receives the data associated with the primary key, the to-be-previewed content is obtained from a cloud storage server according to the primary key and provided to the application server; and the application server receives the to-be-previewed content for preview by a user. On the one hand, the document is converted for preview page by page, which can reduce the time required for the conversion of the entire document. On the other hand, the document for review is provided to the user in a cached and queued conversion manner, which can improve the performance of the overall system and is suitable for users to concurrently access the preview. Moreover, the document is triggered to be converted only when the user selects to preview the document, so that the server does not need to convert all the documents, thereby reducing the burden on the server. Further, the cache may be cleaned up periodically according to the pageview counts and most recent visit times of the pages of the documents, which can improve the speed of document preview for the user.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Apparently, the drawings in the following description are only some embodiments of the present disclosure, and other drawings may be obtained by those skilled in the art from the drawings without paying creative effort.

DETAILED DESCRIPTION

Figure 1:
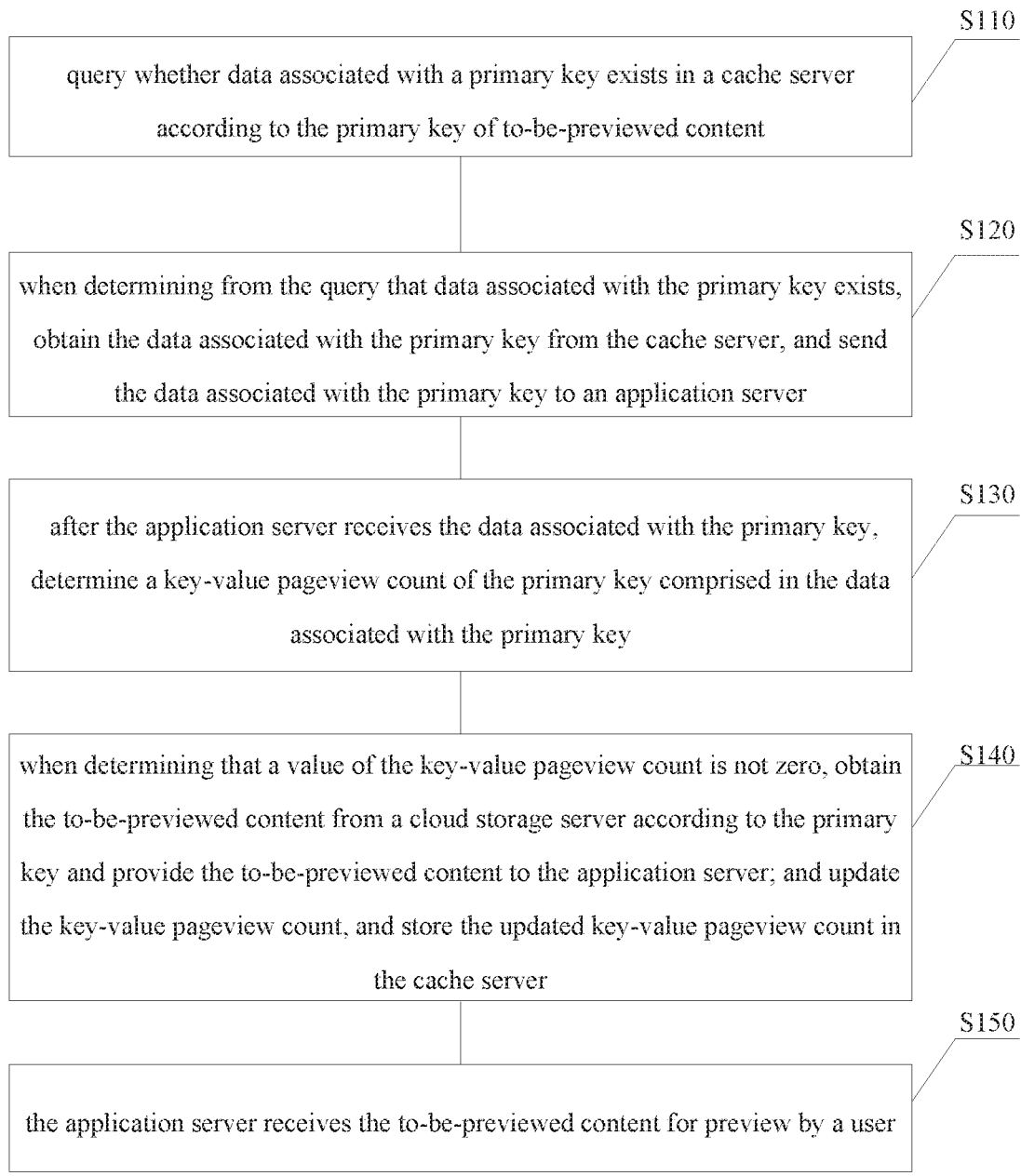
FIG. 1 schematically shows a flow chart of a method for previewing a document online according to an exemplary embodiment of the present disclosure.

Exemplary embodiments will now be described more fully with reference to the accompanying drawings. However, the exemplary embodiments can be embodied in a variety of forms and should not be construed as being limited to the examples set forth herein. Rather, these embodiments are provided to make the present disclosure more thorough and complete, and to fully convey the concept of the exemplary embodiments to those skilled in the art. The described features, structures, or characteristics may be combined in any suitable manner in one or more embodiments. In the following description, numerous specific details are set forth to provide a thorough understanding of the embodiments of the present disclosure. However, one skilled in the art will appreciate that one or more of the specific details may be omitted for practicing the technical solution of the present disclosure, or other methods, components, devices, steps, or the like may be employed. In other instances, well-known technical solutions will not be illustrated or described in detail to avoid obscuring the details of the present disclosure.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily have to correspond to physically or logically separate entities. These functional entities may be implemented in software, or implemented in one or more hardware modules or integrated circuits, or implemented in different networks and/or processor devices and/or microcontroller devices.

In an exemplary embodiment, a method for previewing a document online is first provided. Referring to FIG. 1, the method for previewing a document online may include the following steps.

In S110, it is queried whether data associated with a primary key exists in a cache server according to the primary key of to-be-previewed content.

In S120, when it is determined from the query that data associated with the primary key exists, the data associated with the primary key is obtained from the cache server, and sent to an application server.

In S130, after the application server receives the data associated with the primary key, a key-value pageview count of the primary key included in the data associated with the primary key is determined.

In S140, when it is determined that a value of the key-value pageview count is not zero, the to-be-previewed content is obtained from a cloud storage server according to the primary key and provided to the application server.

In S150, the key-value pageview count is updated, and the updated key-value pageview count is stored in the cache server.

In S160, the application server receives the to-be-previewed content for preview by a user.

In the method for previewing a document online according to the exemplary embodiment, on the one hand, the document is converted for preview page by page, which can reduce the time required for the conversion of the entire document. On the other hand, the document for preview is provided to the user in a cached and queued conversion manner, which can improve the performance of the overall system and is suitable for users to concurrently access the preview. Moreover, the document is triggered to be converted only when the user selects to preview the document, so that the server does not need to convert all the documents, thereby reducing the burden on the server.

Further, the cache may be cleaned up periodically according to the pageview counts and most recent visit times of the pages of the documents, which can improve the speed for the user to preview a document.

Hereinafter, each step of the above-described method for previewing a document online in the present exemplary embodiment will be described in detail.

In step S110, it is queried whether data associated with a primary key exists in a cache server according to the primary key of to-be-previewed content.

In the exemplary embodiment, the to-be-previewed content may include one or more pages of a document that the user needs to view. The primary key may include one or more fields; the primary key of the to-be-previewed content may include a document number and a page number corresponding to the document. The cache server may be a server that determines whether the document or the current page of the document request for review by the user has been converted. For example:

When a user selects a document and intends to review one page of the document, the user sends a request to an application server. Upon receiving the user request, the application server takes a document number (such as JDZL00001) and a page number (such as the first page) corresponding to the document as a joint primary key (the key may be JDZL00001-1, briefly referred to as a primary key), and searches a cache server to see whether data associated with the primary key exists according to the primary key. In addition, in other exemplary embodiment of the present disclosure, the search may be performed according to other condition, which is not particularly limited in the embodiments of the present disclosure.

In step S120, if data associated with the primary key is searched out, data associated with the primary key is obtained from the cache server, and sent to an application server.

In the exemplary embodiment, the data associated with the primary key may include a primary key, a key-value pageview count, a visit time, and the like. The key-value pageview count may indicate a pageview count of a page in a to-be-previewed document. The visit time may include a most recent pageview time. However, the present exemplary embodiment does not particularly limit the data associated with the primary key, and in other exemplary embodiments of the present disclosure, it may also include other data.

In the exemplary embodiment, when it is determined from the query that the data associated with the primary key exists, for example, the application server first searches the cache server to query whether there is data corresponding to the document and the page of the document to be previewed. If the application server determines that there is data corresponding to the document and the page of the document to be previewed in the cache server, directly obtains the document and the page of the document and the data corresponding to the document and the page of the document, such as the pageview count and the most recent pageview time, and sends the data to the application server.

In another embodiment of the present example, if the application server determines that data corresponding to the document and the page of the document to be previewed does not exist in the cache server, the application server obtains the data associated with the primary key from a database, and if the data associated with the primary key exists in the database, the application server may send the data associated with the primary key to the cache server. If the data associated with the primary key does not exist in the database, a data original value associated with the primary key is created in the database and sent to the cache server. The data original value has a key-value pageview count which is zero, and a visit time which is the current visit time. For example, if the application server determines the document and the page of the document to be previewed does not exist in the cache server, the application server obtains the document and the corresponding page number in the document, as well as the pageview count of the page and the most recent pageview time, and sends them to the application server. If the document and the corresponding page in the document, as well as the pageview count of the page and the most recent pageview time do not exist in the database, the document and the corresponding page in the document as well as the pageview count of the page and the most recent pageview time are created in the database and are sent to the application server. The pageview count is zero and the pageview time is the current time.

In step S130, upon receiving the data associated with the primary key, the application server determines a key-value pageview count of the primary key included in the data associated with the primary key.

For example, after the application server receives the document and the corresponding page in the document and the pageview count of the page and the most recent pageview time, the application server may determine the pageview count.

In step S140, when it is determined that a value of the key-value pageview count is not zero, the to-be-previewed content is obtained from a cloud storage server according to the primary key and provided to the application server, and the key-value pageview count is updated, and the updated key-value pageview count is stored in the cache server.

Figure 2:
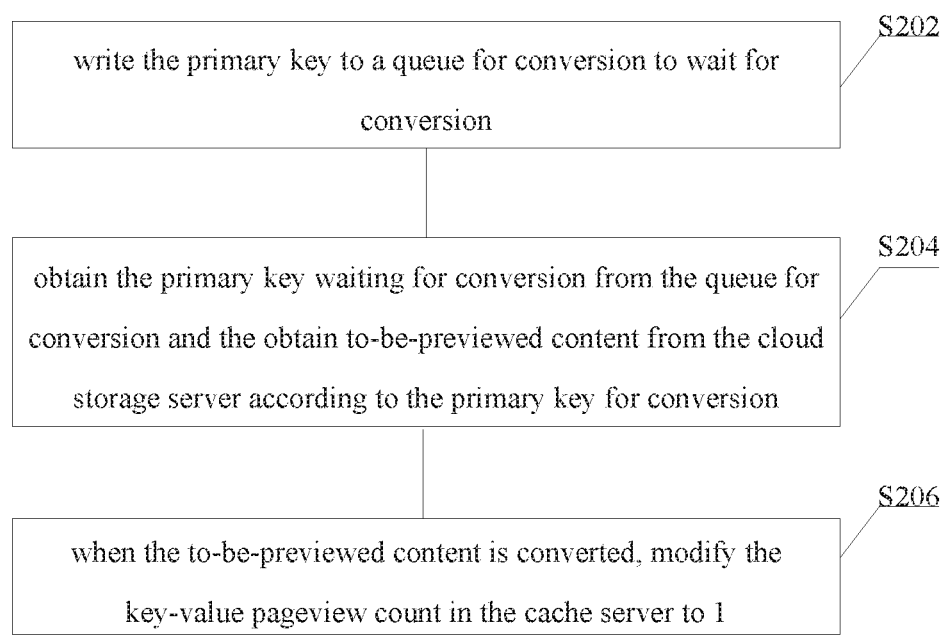
FIG. 2 schematically illustrates a flow chart of a method for converting preview content according to an exemplary embodiment of the present disclosure.

When it is determined that a value of the key-value pageview count is zero, the preview content is converted, and the converted preview content is uploaded to the cloud storage server. The original pageview count is added by 1, and then the updated pageview count is stored in the cache server. Referring to FIG. 2, in the present exemplary embodiment, converting the preview content may include the following steps S202 to S206.

In step S202, the primary key is written to a queue for conversion to wait for conversion.

In step S204, the primary key waiting for conversion is obtained from the queue for conversion and the to-be-previewed content is obtained from the cloud storage server according to the primary key for conversion. For example:

In the exemplary embodiment, the primary key waiting for conversion is obtained from the queue in a single-threaded manner or a multi-threaded manner, and the to-be-previewed content is obtained from the cloud storage server according to the primary key, which is not limited in the exemplary embodiment. In addition, in other exemplary embodiment of the present disclosure, the primary key waiting for conversion may be obtained from the queue according to other situation and in other manner, which is not particularly limited in the exemplary embodiment.

The above thread can be understood as: Lightweight Process (LWP), which is the smallest unit in the program execution flow; a standard thread consists of a thread ID, a current instruction pointer (PC), a register set and a stack. The queue can be understood as: a linear table characterized in that it only allows a delete operation from the front of the table, and an insert operation to the rear of the table, like the stack, and the queue is a linear table with restricted operations. The end allowing for insert operation is called the tail of the queue, and the end allowing for delete operation is called the head of the queue; however, the embodiment of the present disclosure is not limited thereto.

In the exemplary embodiment, the format generated after the to-be-previewed content is converted may include: .html, .doc, .docx. .xls, .xlsx, .ppt, .pptx, .txt, or .pdf, etc., which is not limited in the exemplary embodiment.

In step S206, when the to-be-previewed content is converted, the key-value pageview count in the cache server is modified to 1, thereby facilitating the subsequent process.

In addition, in the exemplary embodiment, when the preview content is converted, a user waiting sign may be further provided. When the conversion of the preview content is completed, the user waiting sign may be cancelled. If a preset timeout period is exceeded, a prompt is presented indicating conversion failure and the conversion has to be performed again. With the user waiting sign, the user can clearly see the specific conversion progress of the document and it can improve the user experience.

In step S150, the application server receives the to-be-previewed content to provide preview for the user.

For example, after receiving the to-be-previewed content of the page, the application server may send the to-be-previewed content of the page to the terminal, and the user may preview the final result through the terminal. In the exemplary embodiment, the terminal may include various electronic devices having a display screen, such as a mobile phone, a tablet computer, a notebook computer, a desktop computer, a game console, and a PDA.

Figure 3:
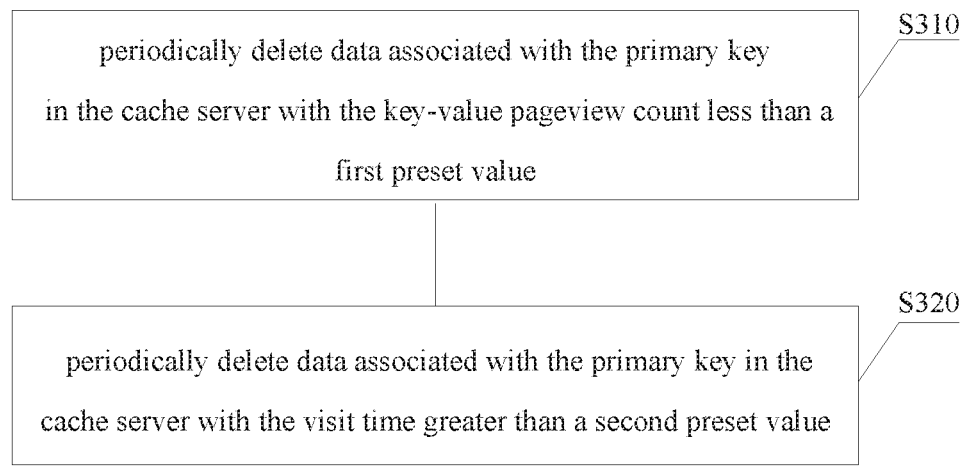
FIG. 3 schematically shows a flow chart of another method for previewing a document online according to an exemplary embodiment of the present disclosure.

In other exemplary embodiments, referring to FIG. 3, the method for previewing a document online may further include step S310 and step S320.

In step S310, the data associated with the primary key in the cache server with the key-value pageview count less than a first preset value is periodically deleted. In step S320, the data associated with the primary key in the cache server with the visit time greater than a second preset value is periodically deleted. Specifically, in order to make full utilization of the cache server memory and to meet the high performance of the system, the page content to be viewed by the user in the document should be obtained from the cache server as much as possible, therefore, the documents and pages with a relatively low pageview counts can be periodically deleted from the cache server, or the documents and pages has a visit time relatively old from the current time can be periodically deleted from the cache server. The deleted documents and pages may be stored in the database. In this way, it can also ensure the maximum flexibility of the data cached in the cache server.

The following is a device embodiment of the present disclosure, which can be configured to perform the method embodiment of the present disclosure. For details not disclosed in the device embodiment of the present disclosure, please refer to the method embodiment of the present disclosure.

Figure 4:
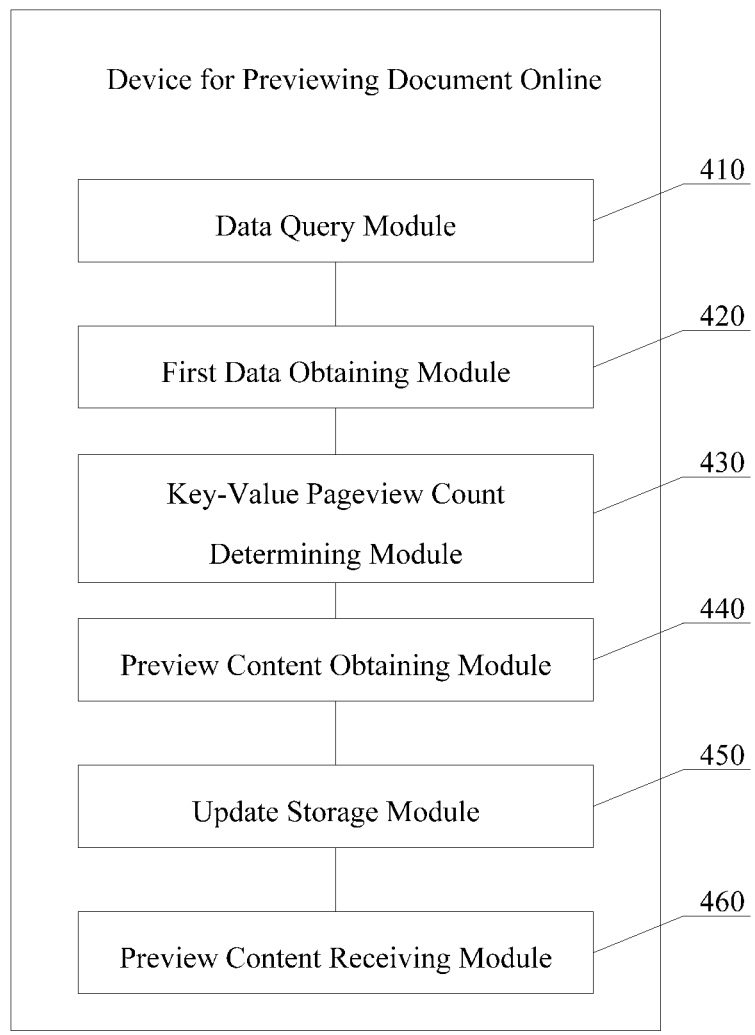
FIG. 4 schematically shows a block diagram of a device for previewing a document online according to an exemplary embodiment of the present disclosure.

In an exemplary embodiment, a device for previewing a document online is further provided. Referring to FIG. 4, the device for previewing a document online may include: a data query module 410, a first data obtaining module 420, a key-value pageview count determining module 430, a preview content obtaining module 440, an update storage module 450, and a preview content receiving module 460.

The data query module 410 is configured to query whether data associated with a primary key exist in a cache server according to the primary key of to-be-previewed content.

The first data obtaining module 420 is configured to, if data associated with the primary key is searched out, obtain data associated with the primary key from the cache server, and send the data associated with the primary key to an application server.

The key-value pageview count determining module 430 is configured to, after the application server receives the data associated with the primary key, determine a key-value pageview count of the primary key included in the data associated with the primary key.

The preview content obtaining module 440 is configured to, when it is determined that a value of the key-value pageview count is not zero, obtain the to-be-previewed content from a cloud storage server according to the primary key and provide it to the application server.

The update storage module 450 is configured to update the key-value pageview count, and store the updated key-value pageview count in the cache server.

The preview content receiving module 460 is configured to receive, by the application server, the to-be-previewed content to provide preview for the user.

In the device for previewing a document online according to the exemplary embodiment, the document is converted for preview page by page, which can reduce the time required for the conversion of the entire document. The document for review is provided to the user in a cached and queued conversion manner, which can improve the performance of the overall system and is suitable for users to concurrently access the preview. Moreover, the document is triggered to be converted only when the user selects to preview the document, so that the server does not need to convert all the documents, thereby reducing the burden on the server. Further, the cache may be cleaned up periodically according to the pageview counts and most recent visit times of the pages of the documents, which can improve the speed for the user to preview a document.

In another embodiments, the device further includes:

a second data obtaining module configured to, if it is determined from the query that the data associated with the primary key does not exist, obtain the data associated with the primary key from a database;

a first data sending module configured to, if the data associated with the primary key exists in the database, send the data associated with the primary key to the cache server; and a second data sending module configured to, if the data associated with the primary key does not exist in the database, create a data original value associated with the primary key in the data base and send it to the cache server, wherein the data original value has a key-value pageview count which is zero, and a visit time which is the current visit time.

In other exemplary embodiments, the device further includes:

a preview content conversion module configured to, when it is determined that the value of the key-value pageview count is zero, convert the preview content, and upload the converted preview content to the cloud storage server.

In the exemplary embodiment, converting the preview content includes:

writing the primary key to a queue for conversion to wait for conversion; and obtaining the primary key waiting for conversion from the queue for conversion and obtaining the to-be-previewed content from the cloud storage server according to the primary key for conversion.

In the exemplary embodiment, it further includes:

when the preview content conversion is completed, modifying the key-value pageview count in the cache server to 1.

In the exemplary embodiment, it further includes:

providing a user waiting sign while converting the preview content; and when the conversion of the preview content is completed, cancelling the user waiting sign.

In the exemplary embodiment, the device further includes:

a first data deletion module configured to periodically delete data associated with the primary key in the cache server with the key-value pageview count less than a first preset value; and a second data deletion module configured to periodically delete data associated with the primary key in the cache server with the visit time greater than a second preset value.

The specific details of each module in the device for previewing a document online have been described in detail in the corresponding method for previewing a document online, and therefore will not be described in detail herein.

The present disclosure also provides an electronic device including one or more processors; a memory for storing one or more programs, and when the one or more programs are executed by the one or more processors, one or more processors are caused to implement the method for previewing a document online as described above.

The present disclosure also provides a computer readable medium having stored thereon a computer program that, when executed by a processor, implements a method for previewing a document online as described above.

It should be noted that although several modules or units of the device for action execution are mentioned in the detailed description above, such division is not mandatory. Indeed, in accordance with embodiments of the present disclosure, the features and functions of two or more modules or units described above may be embodied in one module or unit. Conversely, the features and functions of one module or unit described above may be further divided into multiple modules or units.

In addition, although the various steps of the method of the present disclosure are described in a particular order in the drawings, this is not required or implied that the steps must be performed in the specific order, or all the steps shown must be performed to achieve the desired result. Additionally or alternatively, certain steps may be omitted, multiple steps being combined into one step, and/or one step may be decomposed into multiple steps for execution and the like.

In an exemplary embodiment of the present disclosure, there is also provided a computer readable storage medium having stored thereon a computer program, the program being executable by, for example, a processor, capable of implementing the steps of the electronic prescription circulation processing method according to any one of the above embodiments. In some possible implementations, aspects of the present disclosure may also be embodied in the form of a program product including program codes. When the program product is running on a terminal device, the program codes cause the terminal device to perform the steps of the electronic prescription circulation processing method according to various exemplary embodiments in the description.

Figure 5:
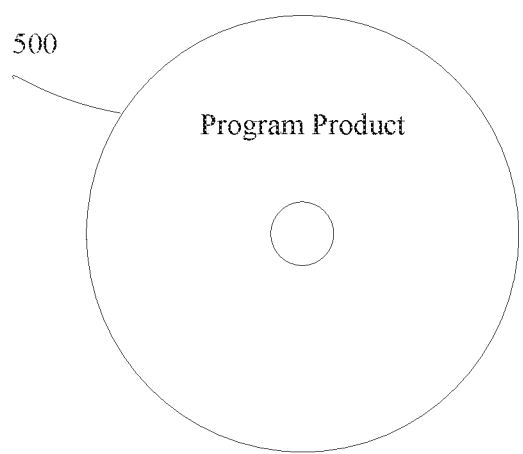
FIG. 5 is a schematic diagram showing a computer readable storage medium according to an exemplary embodiment of the present disclosure.

Referring to FIG. 5, a program product 500 for implementing the above method in accordance with an embodiment of the present disclosure is illustrated. The program product 500 may be a portable compact disk read only memory (CD-ROM) and may include program codes, and may be in a terminal device, for example, running on a personal computer. However, the program product of the present disclosure is not limited thereto, and in the present document, the readable storage medium may be any tangible medium containing or storing a program that can be used by or in connection with an instruction execution system, apparatus or device.

The program product can be any combination of one or more readable media. The readable medium can be a readable signal medium or a readable storage medium. The readable storage medium can be, for example, but not limited to, an electronic, magnetic, optical, electromagnetic, infrared, or semiconductor system, apparatus, or device, or any combination of the above. More specific examples (non-exhaustive lists) of the readable storage media include: electrical connections with one or more wires, portable disks, hard disks, a random access memory (RAM), a read only memory (ROM), an erasable Programmable read-only memory (EPROM or flash memory), an optical fiber, a portable compact disk read only memory (CD-ROM), an optical storage device, a magnetic storage device, or any suitable combination of the foregoing.

The computer readable storage medium can include a data signal that is propagated in a baseband or as part of a carrier, in which readable program codes are carried. Such propagated data signals can take a variety of forms including, but not limited to, electromagnetic signals, optical signals, or any suitable combination of the foregoing. The readable storage medium can also be any readable medium other than a readable storage medium that can transmit, propagate or transport a program for use by or in connection with an instruction execution system, apparatus or device. The program codes embodied on a readable storage medium may be transmitted by any suitable medium, including but not limited to wireless, wireline, optical cable, RF, etc., or any suitable combination of the foregoing.

Program codes for performing the operations of the present disclosure may be written in any combination of one or more programming languages, including an object oriented programming language such as Java, C++, etc., including conventional procedural programming language-such as the "C" language or a similar programming language. The program codes can be executed entirely on the user computing device, partially on the user device, as a stand-alone software package, partially on the remote computing device on the user computing device, or entirely on a remote computing device or server. In the case of a remote computing device, the remote computing device can be connected to the user computing device via any kind of network, including a local area network (LAN) or wide area network (WAN), or can be connected to an external computing device (e.g., via Internet through an Internet service provider).

In an exemplary embodiment of the present disclosure, there is also provided an electronic device. The electronic device includes a processor, and a memory for storing executable instructions of the processor. Wherein the processor is configured to perform the steps of the electronic prescription flow processing method in any one of the above embodiments by executing the executable instructions.

Those skilled in the art will appreciate that various aspects of the present disclosure can be implemented as a system, a method, or a program product. Therefore, various aspects of the present disclosure may be embodied in the form of a complete hardware implementation, a complete software implementation (including firmware, microcode, etc.), or a combination of hardware and software, which may be collectively referred to as "circuit", "module", or "system" herein.

An electronic device 600 in accordance with such an embodiment of the present disclosure is described below with reference to FIG. 6. The electronic device 600 shown in FIG. 9 is merely an example and should not impose any limitation on the function and application scope of the embodiments of the present disclosure.

Figure 6:
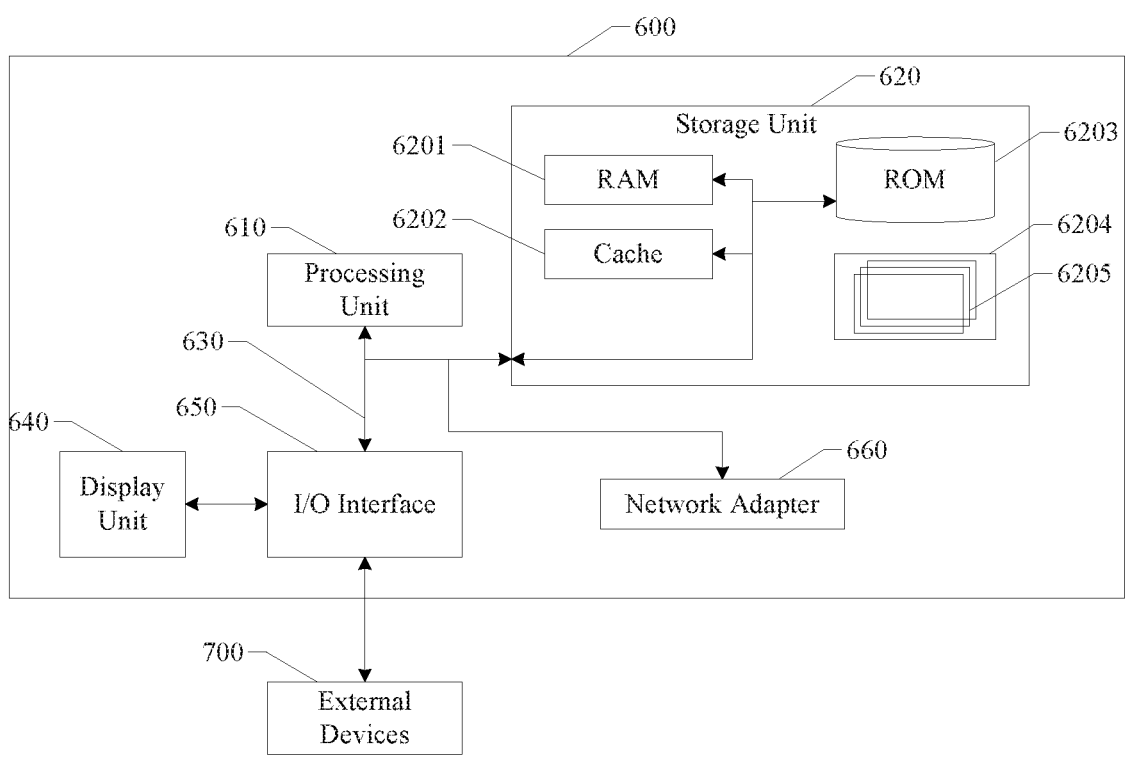
FIG. 6 schematically shows a schematic diagram of an electronic device according to an exemplary embodiment of the present disclosure.

As shown in FIG. 6, electronic device 600 is embodied in the form of a general purpose computing device. The components of the electronic device 600 may include, but are not limited to, at least one processing unit 610, at least one storage unit 620, a bus 630 that connects different system components (including the storage unit 620 and the processing unit 610), a display unit 640, and the like.

The storage unit stores program codes, and the program codes may be executed by the processing unit 610, such that the processing unit 610 performs the steps of the electronic prescription circulation processing method according to any one of the above embodiments. For example, the processing unit 610 can perform the steps as shown in FIG. 1.

The storage unit 620 can include a readable medium in the form of a volatile storage unit, such as a random access storage unit (RAM) 6201 and/or a cache storage unit 6202, and can further include a read only storage unit (ROM) 6203.

The storage unit 620 can also include a program/utility 6204 having a set (at least one) of the program modules 6205, such as, including but not limited to, an operating system, one or more applications, other program modules, and program data, each or some combination of these examples may include an implementation of a network environment.

The bus 630 may represent one or more of several types of bus structures, including a memory unit bus or a memory unit controller, a peripheral bus, a graphics acceleration port, a processing unit, or a local area or a local bus using any of a variety of bus structures.

The electronic device 600 can also communicate with one or more external devices 700 (e.g., a keyboard, a pointing device, a Bluetooth device, etc.), and can also communicate with one or more devices that enable the user to interact with the electronic device 600, and/or any device (e.g., a router, a modem, etc.) that enable the electronic device 600 to communicate with one or more other computing devices. Such communication can take place via an input/output (I/O) interface 650. Also, electronic device 600 can communicate with one or more networks (e.g., a local area network (LAN), a wide area network (WAN), and/or a public network, such as the Internet) through a network adapter 660. The network adapter 660 can communicate with other modules of the electronic device 600 via the bus 630. It should be understood that although not shown in the figures, other hardware and/or software modules may be utilized in conjunction with the electronic device 600, including but not limited to: microcodes, device drivers, redundant processing units, external disk drive arrays, RAID systems, tape drives and data backup storage systems, etc.

Through the description of the above embodiments, those skilled in the art will readily understand that the exemplary embodiments described herein may be implemented by software or by software in combination with necessary hardware. Therefore, the technical solution according to an embodiment of the present disclosure may be embodied in the form of a software product, which may be stored in a non-volatile storage medium (which may be a CD-ROM, a USB flash drive, a mobile hard disk, etc.) or on a network. A number of instructions are included to cause a computing device (which may be a personal computer, a server, a mobile terminal, or a network device, etc.) to perform a method in accordance with an embodiment of the present disclosure.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

INDUSTRIAL APPLICABILITY

The present disclosure is applicable to the field of Internet technology, and can solve the problem in the related art that the burden of the document conversion server is large, and it can reduce the burden of the server and improve the speed for the user to preview a document.

What is claimed is:

1. A method for previewing a document online, comprising:
    querying, by an application server, whether data associated with a primary key of to-be-previewed content exists in a cache server according to the primary key;
    when determining from the query that data associated with the primary key exists, obtaining, by the application server, the data associated with the primary key from the cache server, and sending, by the cache server, the data associated with the primary key to the application server;
    after the application server receives the data associated with the primary key, determining, by the application server, a key-value pageview count of the primary key comprised in the data associated with the primary key;
    when determining that the value of the key-value pageview count is not zero, obtaining, by the application server, the to-be-previewed content from a cloud storage server according to the primary key, and providing, by the cloud storage server, the to-be-previewed content to the application server; and
    receiving, by the application server, the to-be-previewed content for preview by a user.

2. The method for previewing a document online according to claim 1, further comprising:
    when determining from the query that the data associated with the primary key does not exist, obtaining, by the application server, the data associated with the primary key from a database; and
    when the data associated with the primary key exists in the database, sending, by the application server, the data associated with the primary key to the cache server; and
    when the data associated with the primary key does not exist in the database, creating, by the application server, a data original value associated with the primary key in the database and sending, by the application server, the data original value associated with the primary key to the cache server, wherein the data original value has a key-value pageview count which is zero, and a visit time which is the current visit time.

3. The method for previewing a document online according to claim 1, further comprising:
    when determining that the value of the key-value pageview count is zero, converting, by the application server, the preview content, and uploading, by the application server, the converted preview content to the cloud storage server.

4. The method for previewing a document online according to claim 3, wherein converting, by the application server, the preview content comprises:
    writing, by the application server, the primary key to a queue for conversion to wait for conversion; and
    obtaining, by the application server, the primary key waiting for conversion from the queue for conversion and obtaining, by the application server, the to-be-previewed content from the cloud storage server according to the primary key for conversion.

5. The method for previewing a document online according to claim 4, further comprising: when the preview content conversion is completed, modifying, by the application server, the key-value pageview count in the cache server to 1.

6. The method for previewing a document online according to claim 4, further comprising: providing, by the application server, a user waiting sign while converting the preview content; and
    when the conversion of the preview content is completed, cancelling, by the application server, the user waiting sign.

7. The method for previewing a document online according to claim 3, further comprising: when the preview content conversion is completed, modifying, by the application server, the key-value pageview count in the cache server to 1.

8. The method for previewing a document online according to claim 3, further comprising: providing, by the application server, a user waiting sign while converting the preview content; and
    when the conversion of the preview content is completed, cancelling, by the application server, the user waiting sign.

9. The method for previewing a document online according to claim 1, further comprising: updating, by the application server, the key-value pageview count, and storing, by the application server, the updated key-value pageview count in the cache server; and/or periodically deleting, by the application server, data associated with the primary key in the cache server with the key-value pageview count less than a first preset value; and periodically deleting, by the application server, data associated with the primary key in the cache server with the visit time greater than a second preset value.

10. An electronic device, comprising: one or more processors; a memory for storing one or more programs; and when the one or more programs are executed by the one or more processors, the one or more processors are caused to implement the method for previewing a document online according to claim 1.

11. A non-transitory computer readable storage medium having stored thereon a computer program, wherein the program is executed by a processor to implement the method for previewing a document online according to claim 1.

12. A device for previewing a document online, comprising:

a processor and a memory, wherein the memory stores instructions which, when executed by the processor, cause the device to:

query, by an application server, whether data associated with a primary key exist in a cache server according to the primary key of to-be-previewed content;

when determining from the query that data associated with the primary key exist, obtain, by the application server, the data associated with the primary key from the cache server, and send, by the cache server, the data associated with the primary key to the application server;

after the application server receives the data associated with the primary key, determine, by the application server, a key-value pageview count of the primary key comprised in the data associated with the primary key;

when a value of the key-value pageview count is determined not zero, obtain, by the application server, the to-be-previewed content from a cloud storage server according to the primary key and provide, by the application server, the to-be-previewed content to the application server; and receive, by the application server, the to-be-previewed content to provide preview for the user.

13. The device for previewing a document online according to claim 12, wherein the instructions, when executed by the processor, further cause the device to:

when determining from the query that the data associated with the primary key does not exist, obtain, by the application server, the data associated with the primary key from a database; and when the data associated with the primary key exists in the database, send, by the application server, the data associated with the primary key to the cache server; and when the data associated with the primary key does not exist in the database, create, by the application server, a data original value associated with the primary key in the data base and send, by the application server, the data original value associated with the primary key to the cache server, wherein the data original value has a key-value pageview count which is zero, and a visit time which is the current visit time.

14. The device for previewing a document online according to claim 12, wherein the instructions, when executed by the processor, further cause the device to:

when determining that the value of the key-value pageview count is zero, convert, by the application server, the preview content, and upload, by the application server, the converted preview content to the cloud storage server.

15. The device for previewing a document online according to claim 14, wherein the instructions, when executed by the processor, further cause the device to:

when determining that the value of the key-value pageview count is zero, write, by the application server, the primary key to a queue for conversion to wait for conversion; and obtain by the application server, the primary key waiting for conversion from the queue for conversion and obtain, by the application server, the to-be-previewed content from the cloud storage server according to the primary key for conversion, and upload, by the application server, the converted preview content to the cloud storage server.

16. The device for previewing a document online according to claim 14, wherein the instructions, when executed by the processor, further cause the device to:

when the preview content conversion is completed, modify, by the application server, the key-value pageview count in the cache server to 1.

17. The device for previewing a document online according to claim 14, wherein the instructions, when executed by the processor, further cause the device to:

provide, by the application server, a user waiting sign while converting the preview content; and when the conversion of the preview content is completed, cancel, by the application server, the user waiting sign.

18. The device for previewing a document online according to claim 17, wherein the instructions, when executed by the processor, further cause the device to:

when the preview content conversion is completed, modify, by the application server, the key-value pageview count in the cache server to 1.

19. The device for previewing a document online according to claim 17, wherein the instructions, when executed by the processor, further cause the device to:

provide, by the application server, a user waiting sign while converting the preview content; and when the conversion of the preview content is completed, cancel, by the application server, the user waiting sign.

20. The device for previewing a document online according to claim 12, wherein the instructions, when executed by the processor, further cause the device to:

update, by the application server, the key-value pageview count, and store, by the application server, the updated key-value pageview count in the cache server; and/or periodically delete, by the application server, data associated with the primary key in the cache server with the key-value pageview count less than a first preset value; and periodically delete, by the application server, data associated with the primary key in the cache server with the visit time greater than a second preset value.

* * * * *